United States Patent [19]

Sieverin

[11] 4,386,708
[45] Jun. 7, 1983

[54] CONTAINER REJECT SYSTEM

[75] Inventor: Walter J. Sieverin, McHenry, Ill.

[73] Assignee: American Can Company, Greenwich, Conn.

[21] Appl. No.: 233,946

[22] Filed: Feb. 12, 1981

[51] Int. Cl.³ .............................................. B07C 5/36
[52] U.S. Cl. ................................... 209/549; 209/566; 209/644
[58] Field of Search ............. 209/563, 564, 565, 566, 209/644, 932, 546, 549; 235/925 H

[56] References Cited

U.S. PATENT DOCUMENTS

| | | | |
|---|---|---|---|
| 2,999,591 | 9/1961 | Crump | 209/564 |
| 3,586,168 | 6/1971 | Osheff et al. | 209/565 X |
| 3,802,559 | 4/1974 | Luchetti et al. | 209/565 X |
| 3,899,415 | 8/1975 | Codding et al. | 209/565 X |
| 4,047,613 | 9/1977 | Wright | 209/566 X |
| 4,055,252 | 10/1977 | Klamm et al. | 209/566 X |

Primary Examiner—Robert B. Reeves
Assistant Examiner—Edward M. Wacyra
Attorney, Agent, or Firm—Paul R. Audet; Aaron Passman; Stuart S. Bowie

[57] ABSTRACT

A system for the reject of a single container from a row of multiple closely spaced containers on a moving conveyor. A circuit supplies a signal to a reject mechanism which is a solenoid actuated air blast to remove the container accurately. The circuit combines a shift register output with blanking signals in a first gate and a container position control sensing signal with the output of the first gate in a second gate to produce the appropriate reject signal. Mechanical fine tuning is provided to enable positioning the container signal within the appropriate time window.

4 Claims, 5 Drawing Figures

CONTAINER REJECT SYSTEM

BACKGROUND OF THE INVENTION

This invention relates to an improved container reject system and, more particularly, to apparatus for rejecting accurately a single container from a plurality of closely spaced containers advanced on a conveyor.

It is known to use a shift register in timing controls. It is also known to employ analog time delay circuits for the same purpose. Unfortunately these approaches are not altogether satisfactory in the accurate rejection of a single container from a plurality of closely spaced containers moving on a conveyor past a reject station. The reason for this is that, for example, in the case of an improper weld along a container seam it is critical that the container be removed from the row of closely spaced adjacent containers without disturbing the orientation of these adjacent containers. Thus if the adjacent containers are disturbed during the reject action it is possible that there will be a deleterious effect on the inside stripe RF cure oven located downstream. With this in mind it is essential that the rejection of a container be accomplished at a precise container position and that the container orientation during rejection be precisely controlled. Furthermore the difficulty of ensuring this result is impacted by such factors as variable transport speeds and long distances between the weld zone and reject station.

OBJECTS OF THE INVENTION

It is a principal object of the present invention to improve reject a single container from a plurality of closely spaced containers advanced by a conveyor.

It is another object of the invention to ensure reject and removal of a single container from a row of closely spaced containers without disturbing the orientation of the adjacent containers.

It is a further object of the present invention to provide apparatus for the reject of a single container from a row of closely spaced containers being transported by a plurality of conveyors moving at different speeds.

It is a further object of the invention to provide an accurate rejection of a single container with improper weld advanced from a weld zone towards a reject station.

It is a further object of the invention to enable accurate reject of a single container with improper weld from a row of closely spaced containers without disturbing the orientation of the adjacent containers.

It is a further object of the present invention to fine tune the appropriate container reject point with respect to a reject time window in a container reject system.

It is a further object of the present invention to use container position control to initiate the rejection of the desired container.

It is a further object of the present invention to control the rejected container trajectory.

It is a further object of the present invention to enable reject of containers having various sizes, shapes, and materials in a container reject system.

SUMMARY OF INVENTION

In accordance with the present invention a container reject system enables a reject of a single container from a conveyor moving a plurality of closely spaced containers accurately and without disturbing orientation of adjacent containers. This is accomplished generally speaking by a detection circuit employing a shift register combined with a container sensing signal at the reject station to establish an appropriate time window through appropriate gating. Mechanical fine tuning is provided by positioning the container signal within the time window and using container position control to enable precise rejection of the desired container within this time window frame.

DETAILED DESCRIPTION OF THE INVENTION

Figure 1:
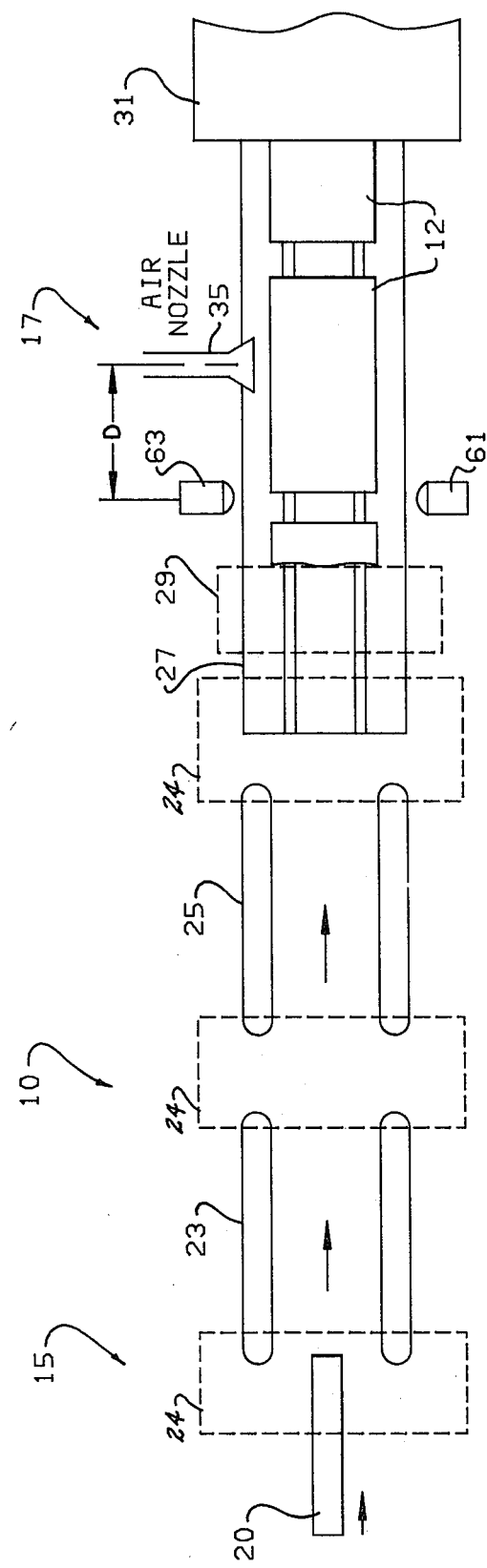
FIG. 1 is plan schematic view of the improved container reject system according to the present invention.

In FIG. 1 there is shown a plan schematic view of a container transport system 10 incorporating the container reject system according to the present invention. The transport system is for the purpose of transporting containers 12 closely spaced from a weld station 15 via multiple conveyors at different speeds towards other processing stations after passing a reject station 17 where improperly welded containers are ejected from the transport path. It will be appreciated, however, that the invention has application to any transport of units past a reject station at which one unit is rejected from a row of closely spaced units.

At the weld station 15 is wheel 20 moving at a suitable weld speed normally associated with a Soudronic®, a Trademark of Soudronic A.G. of Switzerland, 8962 Bergdietikon 2H, Schwerz, Suisse, welder adapted to weld the longitudinal side seam of a thin metal can body. Soudronic welders are known in the art and do not form a part of the present invention. It should be understood, however, that in case the weld is improper that the container must be rejected and removed from the transport system. When welding is completed by the Soudronic welder the container is advanced onto a belt conveyor 23 from the wheel 20 and then onto another belt conveyor 25 moving relatively faster than belt conveyor 23. The containers 12 are then advanced onto still another belt conveyor 27 which moves relatively faster than conveyor 25. Belt conveyor 27 advances the containers past an inside stripe spray zone 29 at which weld seam stripe is sprayed prior to passing into an RF curing oven 31. Dashed lines 24 indicate the zones where the containers leave the previous conveyor to the next conveyor. It will be appreciated that spray zone 29 requires closely spaced containers to avoid loss from overspray. Also it is necessary that the containers have undisturbed orientation for proper curing of the side stripe in the RF curing oven 31.

In accordance with the invention when there is a defect in a container it is rejected and removed at the reject station 17. To accomplish this a reject system including a shift register coupled with an adjustable positional reject mechanism and container position signal provides the means to operate an air nozzle 35 in a manner as will be more fully understood hereinafter.

Figure 2:
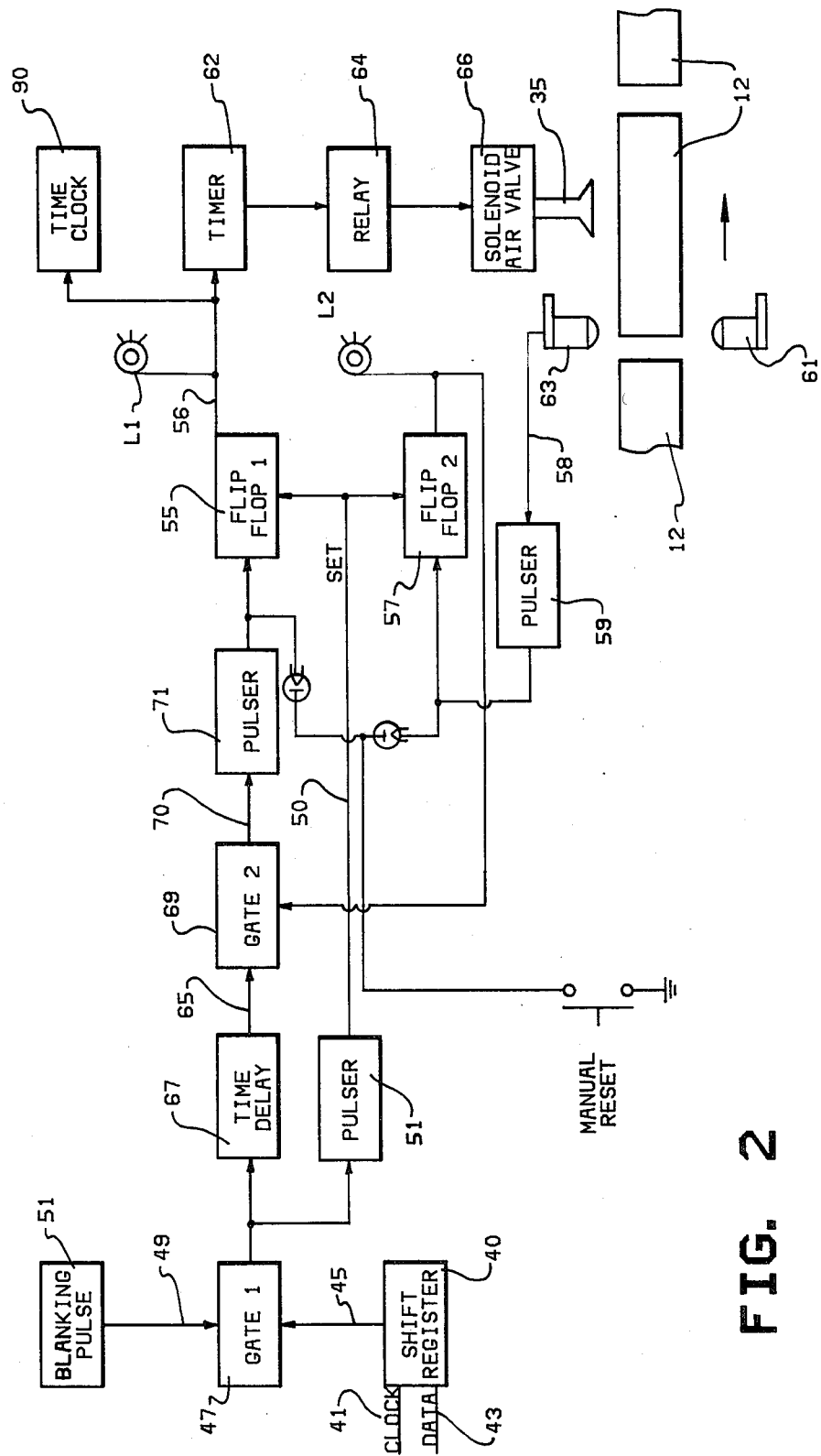
FIG. 2 is a block diagram of a circuit for the reject system of the invention.

Referring now to FIG. 2, there is shown in block diagram form a control circuit for the reject system of the invention. A shift register 40 receives clock input signals 41 and data input signals 43 which determine the reject condition. The output 45 of shift register 40 which is now the reject signal is supplied to AND gate 47 which ANDS it with a blanking signal 49 supplied from blanking pulse source 51. The blanking signal 49 is associated with the Soudronic welder and available therefrom. At the time when the signal 45 from shift register 40 and blanking signal 49 go to logic ONE or a high state, a pair of flip-flops 55 and 57 are set by a signal 50 conditioned by pulser 51 turning on lamps L1 and L2. An output signal 56 of flip-flop 55 also starts event time clock 90 for a purpose to be described. When container 12 uncovers a light source 61 at reject station 17 (FIG. 1) and its associated sensor 63, flip-flop 57 is reset via a signal 58 supplied to a pulser 59 which conditions the signal. As a result lamp L2 goes off. When this happens if the input 65 from a time delay 67 to an AND gate 69 is high, a reset signal 70 is applied to flip-flop 55 via pulser 71 which conditions the signal. Flip-flop 55 then triggers a timer 62 which has an adjustable time period. Timer 62 determines the duration of air blast from nozzle 35 through a relay 64 which actuates a solenoid air valve 66. By proper selection of the time duration of timer 62 and a distance D between sensor 63 and nozzle 35 the trajectory of the container 12 leaving the conveyor can be controlled and varied for the desired conditions.

Figure 3:
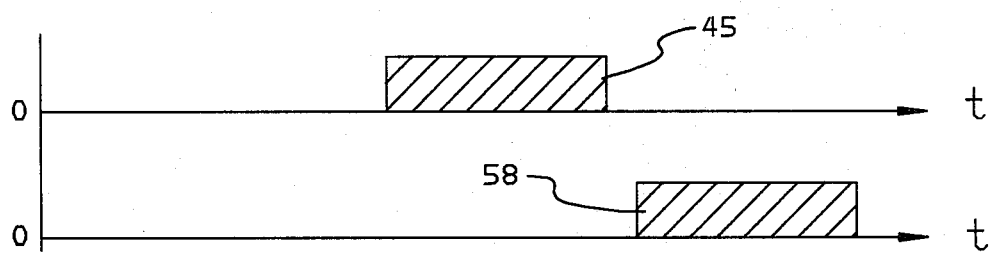
FIGS. 3-5 are signal timing diagrams of the invention illustrating different conditions thereof.

In accordance with the present invention for set-up conditions a single container is fed through the Soudronic welder and the system is set to indicate that a single container is defective. In the set-up mode, FIG. 3 illustrates time condition t where the reject shift signal 45 described in connection with FIG. 2 arrives at the reject station before the container 12 and hence before signal 58. When this occurs lamp L1 will remain on since the appropriate timing of inputs to gate 69 did not occur within the time frame.

Figure 4:
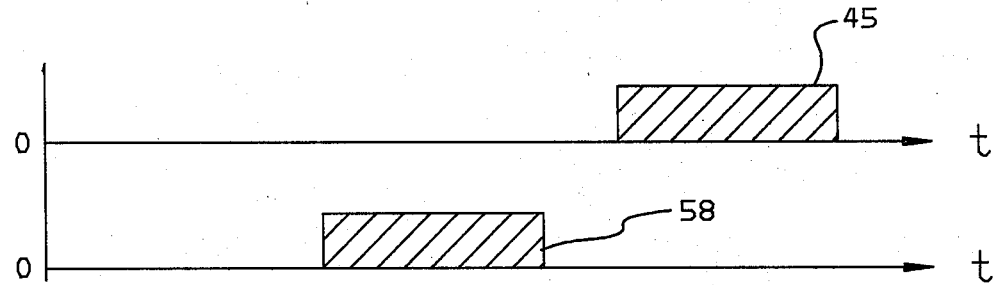

FIG. 4 indicates the time condition when the shift signal 45 occurs after the container signal 58 arrives at the reject station. When this occurs both lamps L1 and L2 remain on to indicate that the shift signal 45 has arrived late.

Figure 5:
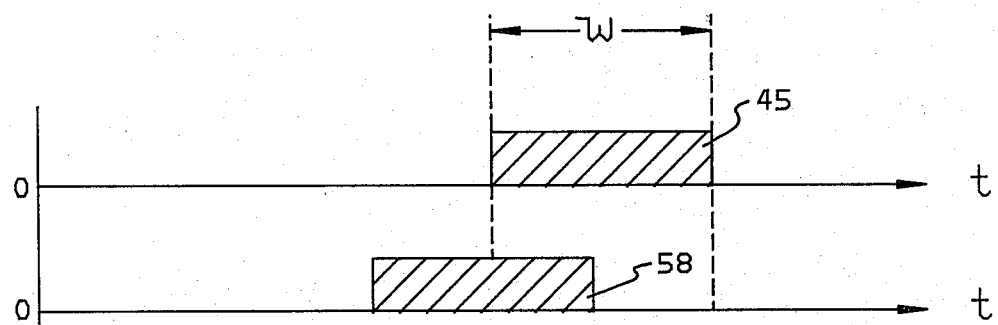

FIG. 5 illustrates the time condition when the shift signal 45 and container signal 58 arrive at the reject station within one window time frame w. When this condition occurs, the output of gate 69 resets flip-flop 55 via pulser 71. As a result timer 62 is initiated to produce an air blast at nozzle 35 through relay 64 and solenoid air valve 66 thereby removing the desired container 12 from the stream of containers.

In accordance with the invention fine tuning of the container signal 58 relative to the shift signal 45 is provided by mechanically adjusting the reject system. This adjustment is indicated by an event time clock 90 (FIG. 2) which is initiated by signal 56. Clock 90 indicates the time duration between the leading edge of shift signal 45 and the trailing edge of container signal 58. For optimum conditions the reject mechanical system position is set for $\frac{1}{2}$ of the reject window frame w of signal 45. It will be noted that this mechanical set point allows transport variability for $\pm\frac{1}{2}$ of the trailing edge of container signal 58 relative to shift signal 45. It will be further appreciated that the nozzle 35 is movable to accommodate various container sizes.

What is claimed is:

1. A system for the reject of a single container from a plurality of closely spaced containers moving on a conveyor;
   conveyor means for transporting closely spaced containers past processing stations;
   container reject means positioned at a reject station, along the conveyor path;
   means for sensing the presence of containers at said reject station and generating signals thereof;
   circuit means including shift register means for generating signals to actuate said container reject means at the appropriate time to reject a container accurately as it passes said reject station, said circuit means including first gate means for combining the output from said shift register means with blanking pulse signals and second gate means for combining signals from said sensing means with the output of said first gate means;
   means for mechanically fine tuning the position of the sensing signals relative to the shift register means output,
   said fine tuning means including a timing clock to indicate the time duration between the leading edge of the output of the shift register means and the trailing edge of the signals from the sensing means, and
   visual display means connected to said sensing means and to said shift register means for comparatively showing the respective signals of each.

2. A system according to claim 1 wherein said container reject means includes a variable timed air blast to control the rejected container trajectory.

3. A system according to claim 1 wherein said conveyor means includes multiple conveyors moving at variable speeds.

4. A system according to claim 1 wherein said processing stations include a weld station, a spray station, and a cure oven station, and wherein said container reject station is positioned intermediate to said spray station and said cure oven station.

* * * * *